E. H. BIEL.
COMBINED HOOK AND FORK.
APPLICATION FILED APR. 15, 1913.
1,075,005.
Patented Oct. 7, 1913.
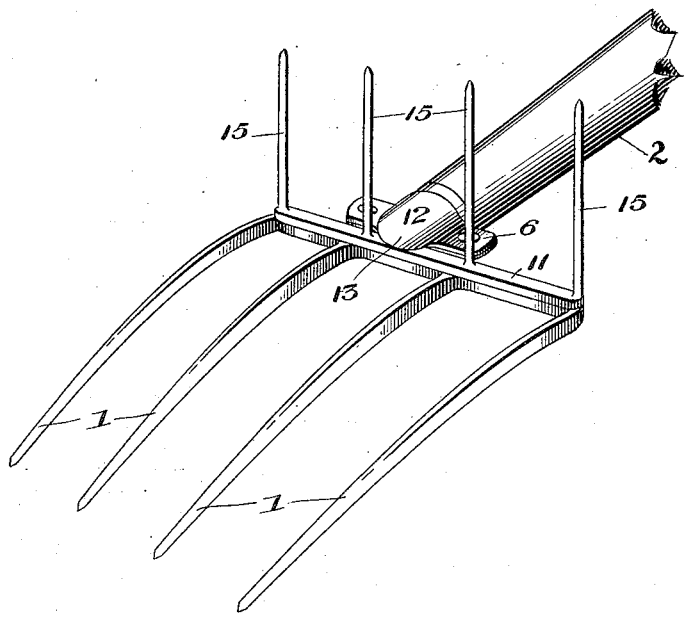
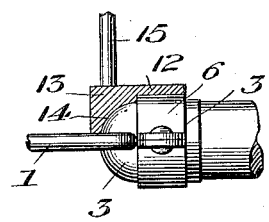

UNITED STATES PATENT OFFICE.

EDWARD H. BIEL, OF RANDOLPH, WISCONSIN.

COMBINED HOOK AND FORK.

1,075,005.   Specification of Letters Patent.   Patented Oct. 7, 1913.

Application filed April 15, 1913. Serial No. 761,230.

*To all whom it may concern:*

Be it known that I, EDWARD H. BIEL, a citizen of the United States, residing at Randolph, county of Dodge, and State of Wisconsin, have invented certain new and useful Improvements in Combined Hooks and Forks, of which the following is a specification.

This invention relates to combined hooks and forks.

The present invention is an improvement on the combined hook and fork set forth in my Patent, No. 1055700, dated March 11, 1913, and has for its object the provision of a simpler and cheaper improved separate fork attachment adapted for application to the handle or ferrule of a three, four, five or six tined pitching fork, and when applied thereto, combines therewith in an improved manner so that the pitching fork is converted into a combined fork and hook, permitting the combined implement to be used as a pitching fork when in ordinary position, and when reversed, to be used as a hook.

The present invention, by its omission of the apertured ear of the combined pitching fork and hook of my patent and by the addition of certain improvements, enables the invention to be applied to pitching forks having four, five and six tines, as well as those having but three, to which latter form of fork the invention of my Patent No. 1055700 is particularly adapted.

The present improvements, being adapted for use in connection with forks having four, five and six tines, enables the hook to be provided with a corresponding number of tines and adapts it to uses to which the three-tined hook of my Patent No. 1055700 is not adapted, as for instance, unloading of manure, handling silage, etc., while having all of the advantages of the hook of that patent in the pulling of straw from a stack and spreading the mow, as explained in my patent.

The present invention is set forth fully hereinafter and its novel features and combinations are recited in the appended claim.

In the accompanying drawings:—Figure 1 is a perspective view of the invention; and Fig. 2, a detail side view thereof, partly in section.

An ordinary four-tined pitching fork is shown at 1 as suitably connected to any preferred handle 2, having the ferrule 3 where it joins the fork. The hook head 11 has tines 15 preferably corresponding in number to the tines of fork 1, being four for a four tined fork, five for a five tined fork, etc. If the invention is made for a three tined fork, only three tines will be provided on the head 11. The head has a part 13 provided with a concavity 14 which receives substantially one-half of the end of ferrule 3 and it is provided with a member 12 which has one part of a clamp 6. The clamp 6 abuts the rear of the head of fork 1 and the hook head 11, having tines 15, rests against the head of fork 1. The hook is thus secured against slipping in any direction.

While the invention consists in the combination of the particular hook with a pitching fork, as set forth, it is in the nature of an attachment which can be applied to any pitching fork at any time and does not, necessarily, have to accompany the pitching fork when the latter is originally manufactured.

Having thus described my invention, what I claim as new and desire to secure by Letters Patent, is:—

The combination with a pitching fork, its handle, and its ferrule, of a detachable hook having a head provided with tines, a clamp, and a connection between the clamp and the hook head, said hook head engaging the fork head and having a concavity receiving the outer end of the ferrule back of the fork head and said clamp embracing the ferrule and abutting the rear part of the fork head.

In testimony whereof, I hereunto affix my signature in presence of two witnesses.

EDWARD H. BIEL.

Witnesses:
E. F. CASEY,
E. E. COXSHALL.

Copies of this patent may be obtained for five cents each, by addressing the "Commissioner of Patents, Washington, D. C."